United States Patent [19]

Williams et al.

[11] Patent Number: 4,955,952

[45] Date of Patent: Sep. 11, 1990

[54] SEISMIC ENERGY SOURCE ARRAY

[75] Inventors: David E. Williams, Metairie, La.; Michael C. Kelly, Sand Springs, Okla.

[73] Assignee: Amoco Corporation, Chicago, Ill.

[21] Appl. No.: 443,767

[22] Filed: Nov. 30, 1989

[51] Int. Cl.⁵ .............................................. G01V 1/40
[52] U.S. Cl. ...................................... 181/111; 367/56; 367/57
[58] Field of Search ........................ 181/111, 113, 401; 367/15, 56, 57, 23, 61

[56] References Cited

U.S. PATENT DOCUMENTS

3,491,848  1/1970  Giles ...................................... 367/23
4,597,464  7/1986  Chelminski .......................... 181/401
4,847,813  7/1989  Alam et al. ............................ 367/57

*Primary Examiner*—Ian J. Lobo
*Attorney, Agent, or Firm*—Scott H. Brown; Fred E. Hook

[57] ABSTRACT

A source array useful in vertical seismic profiling is disclosed wherein a first set of source elements having horizontal extent is spaced to have at least a first direction and a second direction, and a second set of source elements having vertical extent are spaced below the first set of source elements. The source elements in the source array are sequentially activated to focus the seismic energy along selected radial paths through the earth's subsurface.

8 Claims, 7 Drawing Sheets

— PRIOR ART —

FREQUENCY (HZ)

```
            1                    50                      99
            ++++++++++++++++++++++++++++++++++++++++++++++++++
      -90   9999999999999999999999999999999999999999999999999
      -85   9999999999999999999999999999999999999999999999999
      -80   9999999999999999999999999999999999999999999888887
      -75   9999999999999999999999999998888777766665555554
      -70   99999999999999999999988877766665555544444433333332
      -65   999999999999999998877766655544443333332222222111
      -60   9999999999999988776665554444333332222221111111110
      -55   99999999999988776655544433332222221111111110000000
      -50   999999999998776655544433322222111111100000000000
      -45   9999999999877665544433322221111111000000000000
      -40   999999999987765554433322221111110000000000000000
      -35   9999999998776654443332221111110000000000000001111
      -30   999999999876655443322221111100000000000000111112
      -25   99999999877655443332221111100000000000000011111222
      -20   9999999987665443332221111100000000000001111122223
      -15   999999998765544332222111100000000000001111222333
A     -10   99999999876554433222111100000000000011112223334
N      -5   9999999987655443322211110000000000001111122233344
G       0   9999999987655443322211110000000000001111122233344
L       5   9999999987655443322211110000000000001111122233344
E      10   9999999987655443322211110000000000001111222333344
       15   999999998765544332221111000000000000011111222333
       20   9999999987665443332221111100000000000001111122223
       25   99999999876554433322211111000000000000011111222
       30   999999999876655443322221111100000000000000111112
       35   9999999998776654443332221111110000000000000001111
       40   999999999987765554433322221111110000000000000000
       45   9999999999877665544433322221111111000000000000
       50   99999999999877665554443332222221111111000000000
       55   999999999999887766555443332222221111111100000000
       60   9999999999999988776665554444333332222221111111110
       65   999999999999999998877766655544443333332222222111
       70   99999999999999999999988877766666555544444433333332
       75   999999999999999999999999998888777766665555554
       80   9999999999999999999999999999999999999999999888887
       85   9999999999999999999999999999999999999999999999999
       90   9999999999999999999999999999999999999999999999999
```

0 thru 9⁺db down displayed

Fig. 1A

PRIOR ART

```
                              FREQUENCY (HZ)
                         1              50                    99
                         +++++++++++++++++++++++++++++++++++++++++++++++++
                    -90  9999999999999999999999999999999999999999999999999
                    -85  9999999999999999999999999999999999999999999999999
                    -80  9999999999999999999999999999999999999999999999999
                    -75  9999999999999999999999999999999999999999999999998
                    -70  9999999999999999999999999999999999999999999998776
                    -65  9999999999999999999999999999999999999999999877665
                    -60  9999999999999999999999999999999999999999998776555
                    -55  9999999999888888889999999999999999999999988776655
                    -50  999999998777777778899999999999999999999998877766
                    -45  999999987766666667778899999999999999999999998888
                    -40  999999877666555566667788999999999999999999999999
                    -35  999999876655555555566677777888888888999999999999
                    -30  999998766554444444555555566666666666778899999999999
                    -25  999998765544444444444444444444444444555566789999999
                    -20  99999876544433333333333333333333333344556667777777
                    -15  99999986554433333333333322222222212222223344455555555
           A        -10  9999976554433333333322222211111111111122233333344444
           N         -5  99999765543333322322222211110000000011112222333333
           G          0  999997654433333222222211111000000000011112222222333
           L          5  999997655433332222222211110000000001111222222333333
           E         10  99999765544333333322222211111111111122233333344444
                     15  99999865544333333333332222222221222222334445555555
                     20  999998765444333333333333333333333333344556667777777
                     25  999998765544444444444444444444444444555566789999999
                     30  999998766554444444555555566666666666778899999999999
                     35  999999876655555555566677777888888888999999999999
                     40  999999877666555566667788999999999999999999999999
                     45  999999987766666667778899999999999999999999998888
                     50  999999998877777778899999999999999999999999887766
                     55  9999999999888888889999999999999999999999988776655
                     60  9999999999999999999999999999999999999999998776555
                     65  9999999999999999999999999999999999999999999877665
                     70  9999999999999999999999999999999999999999999998776
                     75  9999999999999999999999999999999999999999999999998
                     80  9999999999999999999999999999999999999999999999999
                     85  9999999999999999999999999999999999999999999999999
                     90  9999999999999999999999999999999999999999999999999
```

0 thru 9+db down displayed

SEISMIC ENERGY SOURCE ARRAY

BACKGROUND OF THE INVENTION

1. Field of the Invention

The present invention relates to seismic energy source arrays and, more particularly, to such source arrays which can be used to focus imparted energy towards displaced subsurface features.

2. Setting of the Invention

Vertical seismic profile (VSP) techniques are well-known to those skilled in the art and are very useful in acquiring information concerning the earth's subterranean features. Vertical seismic profiling generally comprises placing a plurality of receiver elements within a wellbore, and placing one or more source elements at the surface, either immediately adjacent the wellbore or spaced outwardly therefrom. A variation of VSP's is to have the receiver elements spaced outwardly on the surface and have the source element within the wellbore. While VSP's provides certain advantages over other seismic techniques, often times the resulting VSP seismic traces or data are barely acceptable in terms of imaging radially displaced subterranean features. Unacceptable seismic data often is acquired in areas of complex geology where energy reflections from secondary (nonimportant) features interfere with the energy reflections from the primary (important) feature to be investigated. Because of this problem, numerous seismic contractors and users of VSP data have been working on developing better VSP techniques to improve the quality of seismic energy traces obtained in these complex geological areas. Various VSP techniques dealing with enhancing the signals reflected from subsurface features are described in U.K. Patent Application GB No. 2029016A, and in the papers "Multi-Offset VSP Profiling" by Mons, OTC 5068, (1985) and "Use of Multiple Sources to Discriminate Between True and Virtual Reflectors in Imaging VSP Data," Noponen, S16.3, pages 770-772.

Figure 1A:
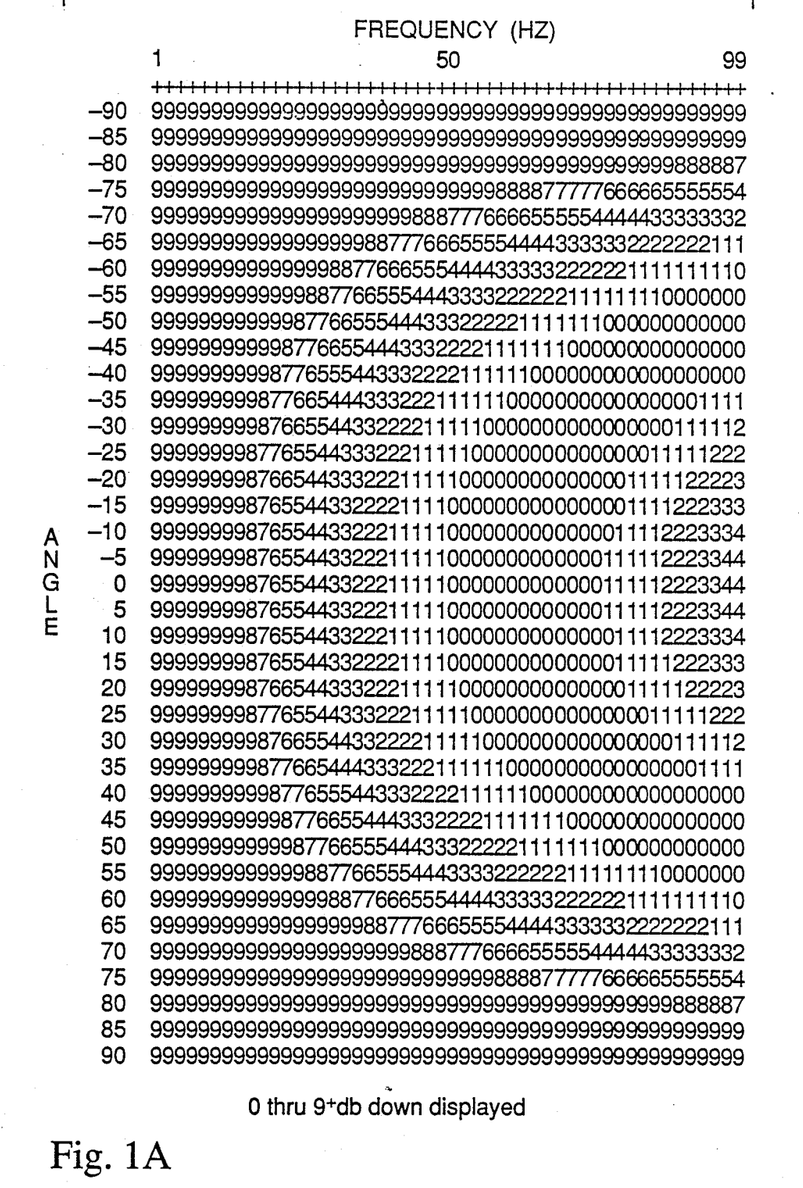
FIG. 1A is a graphical representation of the amplitude response of a Prior Art point source array.

Further, a conventional source array acts as a single point of energy, because without ghost reflections the source array does not display any variation of amplitude with frequency and angle. Including ghost effects will tend to cause some amplitude variations. An amplitude response for a Prior Art source array is shown in FIG. 1A, with the signal amplitude reduction in decibels plotted as a function of radial angle from the wellbore and frequency. This Prior Art source array acts as a point source with no radial preference of response. The same affect can be shown by using Prior Art source arrays with vertical extent, with the source element within the wellbore.

Figure 1B:
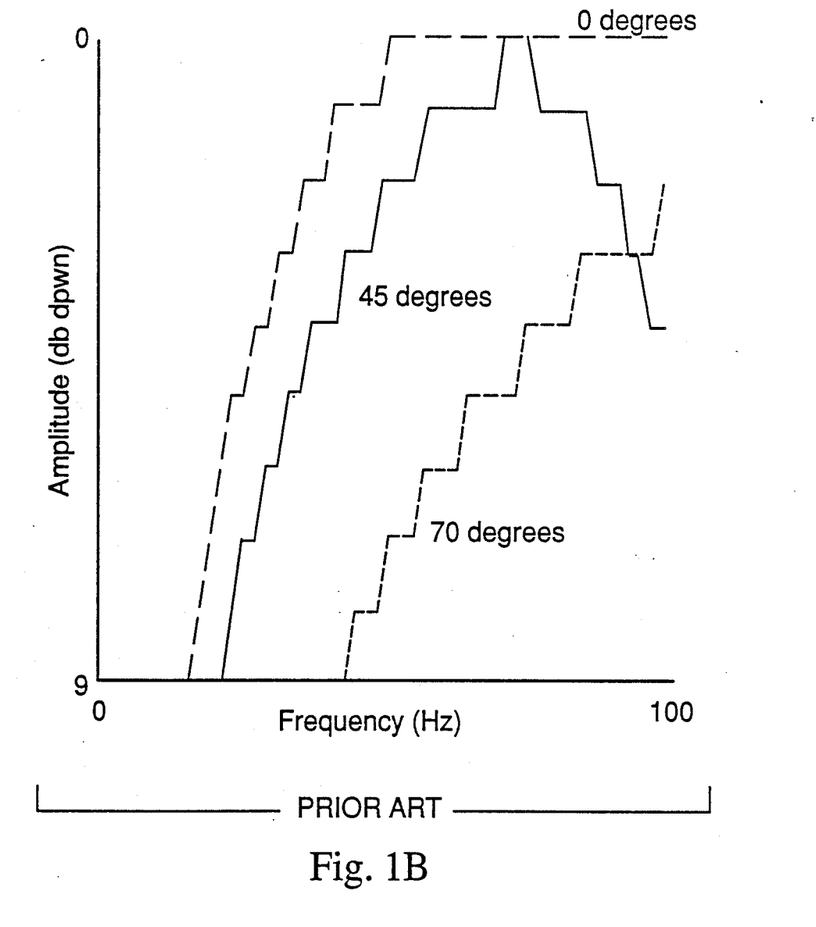
FIG. 1B is a graphically representation of the amplitude spectra for 0°, 45° and 70° radials from the amplitude of the Prior Art point source array of FIG. 1A.

FIG. 1B shows an amplitude spectra for 0°, 45° and 70° radials extracted from the data shown in FIG. 1A. Note that the energy response of the source array for the 0° and 45° radials are approximately equivalent, again confirming that the Prior Art source arrays having simply only either horizontal or vertical extent or very short distanced horizontal and vertical extent (such as 5' or less) act as point sources.

Figure 2:
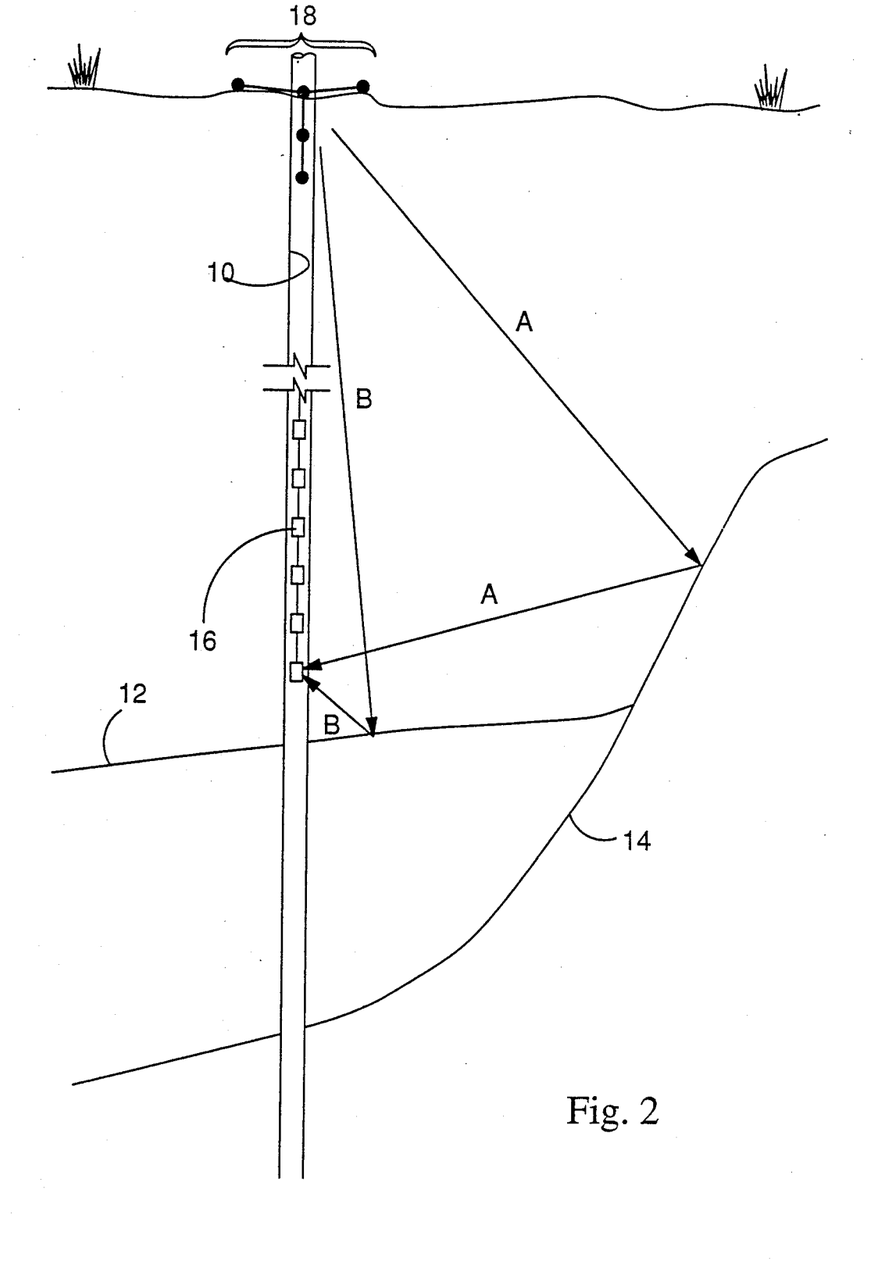
FIG. 2 is a schematic view of a VSP arrangement of receiver elements suspended in a wellbore and a source array, in accordance with the present invention, located at the surface.

The problem with point sources is that in the case shown in FIG. 2 the energy passing along ray path B will be not much different from the energy passing along ray path A. Thus, in the processing, display and interpretation of the seismic data the energy from the two ray paths will tend to obscure the other. So, if one was trying to image the salt dome 14 one could not "steer" the energy coming from the same array towards the salt dome 14 and away from the boundary 12 so that the received energy along ray path A would be stronger than the received energy along ray path B.

There is a need for a VSP source array that can be used to enhance the reflections from the primary features and suppress the reflections from secondary features.

SUMMARY OF THE INVENTION

The present invention has been contemplated to overcome the foregoing deficiencies and meet the above-described needs.

The present invention is a seismic energy source array useful in vertical seismic profiling and a method of use thereof. The source array has a first set of source elements spaced in at least a first direction and a second direction to have horizontal extent. A second set of source elements are spaced below the first set of source elements and has vertical extent. The source array can be used in either the marine environment or on land, as is desired. The horizontal and vertical extent of the same array can be much larger than that commonly used with conventional VSP techniques.

The source elements in the first set and the second set are sequentially activated to focus the seismic energy along selected radial paths through the earth's subsurface, towards the desired primary feature to be imaged, such as by time delayed firing of the source elements.

DETAILED DESCRIPTION OF THE PREFERRED EMBODIMENTS

As shown in FIG. 2, a wellbore 10 has been drilled into the earth's subsurface, which includes two subterranean features: a lithological boundary 12 and an offset structure, such as a salt dome 14. One or more seismic energy receiver elements 16 are suspended within the wellbore 10, as is well-known to those skilled in the art of vertical seismic profiling. A source array 18 in accordance with the present invention is used with the receiver array 16, and includes source elements spaced in gun, water gun, and the like or any type of gun combination, as is desired.

Figure 3:
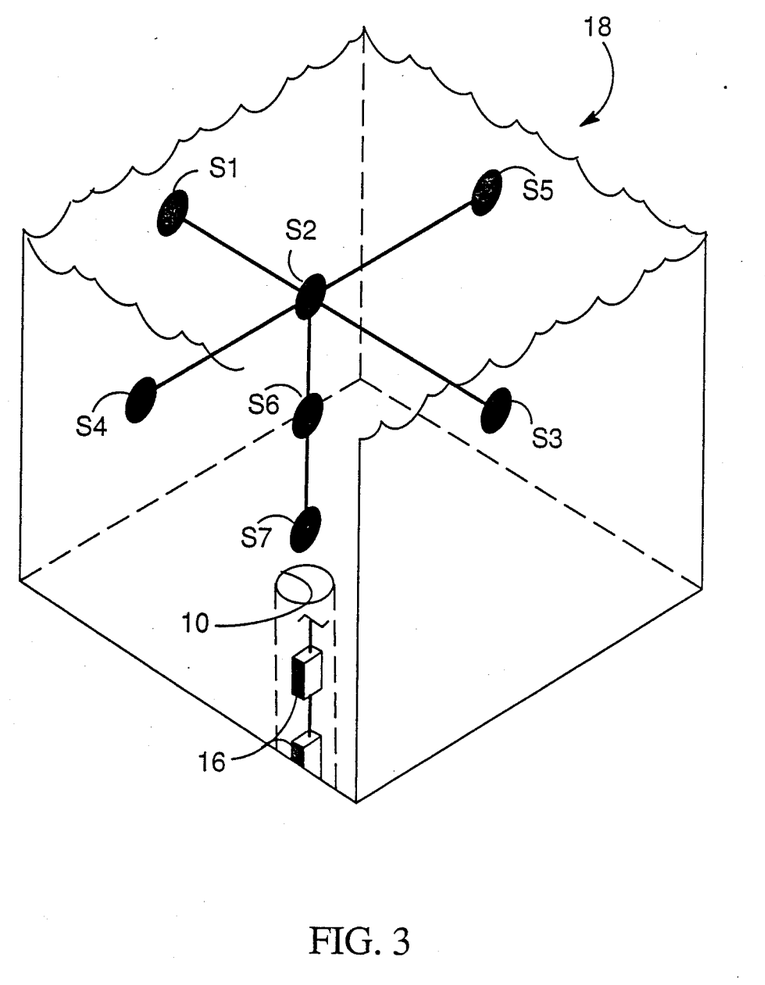
FIG. 3 is a perspective view of a source array of the present invention located within water and above a wellbore.

As shown in FIG. 3, a source array 18 is located in water and has a plurality of source elements spaced to have a horizontal extent and a vertical extent. Source elements S1, S2, and S3 are spaced apart to have a horizontal extent in a first direction and source elements S4, S2 and S5 are spaced apart to have a horizontal extent in a second direction. The first direction and the second direction in the horizontal extent are shown at approximately 90° one to the other; however, any desired angle between one to the other can be utilized. Further, the source elements of the first and second directional horizontal extents of the first set are shown to be at a common depth or on the same plane. However, this may not need be the case and one or more of the source elements in the first set, either in the first or second direction, can be spaced above or below the other as is desired. The first set of source elements are spaced horizontally in any pattern as long as there is at least two sources forming a subset extending in a first direction and at least two sources forming a subset extending in a second, nonparallel direction. The source elements can be spaced in the form of a circle, square, rectangle, triangle, oval, star or any other pattern as desired. In this manner, any form of this source array will be equivalent to a full or a decimated circle.

A second set of source elements including S6, S7, and S2, can be spaced to have a vertical extent. The second set is spaced beneath the first set of source elements, but this set does not need to be centered directly under the mid-point of the first set (as is shown in FIG. 3), but can be spaced beneath any portion of the first set or slightly displaced therefrom as is desired. The source array 18 of the present invention can also be used on land, as shown in FIG. 2, wherein the source elements in the second set with vertical extent (S6 or S7) can be placed within the wellbore 10 or within dry or fluid filled pits or holes in the ground as is desired. More than one line of vertically extending source elements can be used.

The spacing between the individual source elements can be varied in any desired pattern. For an array to have energy focusing capabilities, the dimensions of the array should be on the order of or larger than one-fourth of the dominant wave lengths of the radiation emitted by the sources which make up the array. An example of this would be an array made up of air guns whose dominant frequency would be 40 Hz. The dominant wave length would be around be 125 ft. One-fourth of this value would be around 30 ft. The distance between source elements within the array should then be about 30 ft or more. An array with dimensions that are significantly smaller (more than 50%) than this would produce an array that has negligible focusing capability. Arrays with smaller dimensions would produce good signatures but would not focus energy any better than a point source array would. For example, the can be displaced one from another in the first direction by about 50 ft and in the second, nonparallel direction by about 50 ft. The spacings between the source elements can be greater or less than 50 ft, as is desired, and the spacings between the source elements S1, S2 and S3, and S4, S2 and S5 can be the same or different, again as is desired. In this example, the spacings between the second set of source elements having the vertical extent can be about 20'. The spacings between these source elements can be greater than or less than 20', as is desired, and the spacings between these source elements can be the same or different, again as is desired. Also, the spacings between these source elements can be equal to the first set as is desired.

The first set of seismic source elements having the horizontal extent can be located at or near the earth's surface as is desired; in the marine environment it is desirable to have the source elements spaced below the wave action, such as at about 20 ft depth.

FIG. 3 should only be understood as being illustrative of one embodiment of the present invention in that the source elements are shown directly above a wellbore 10 with the receiver element array 16 being suspended therein. The source array can be displaced laterally from the receiver array and/or the wellbore as is desired.

Figure 4A:
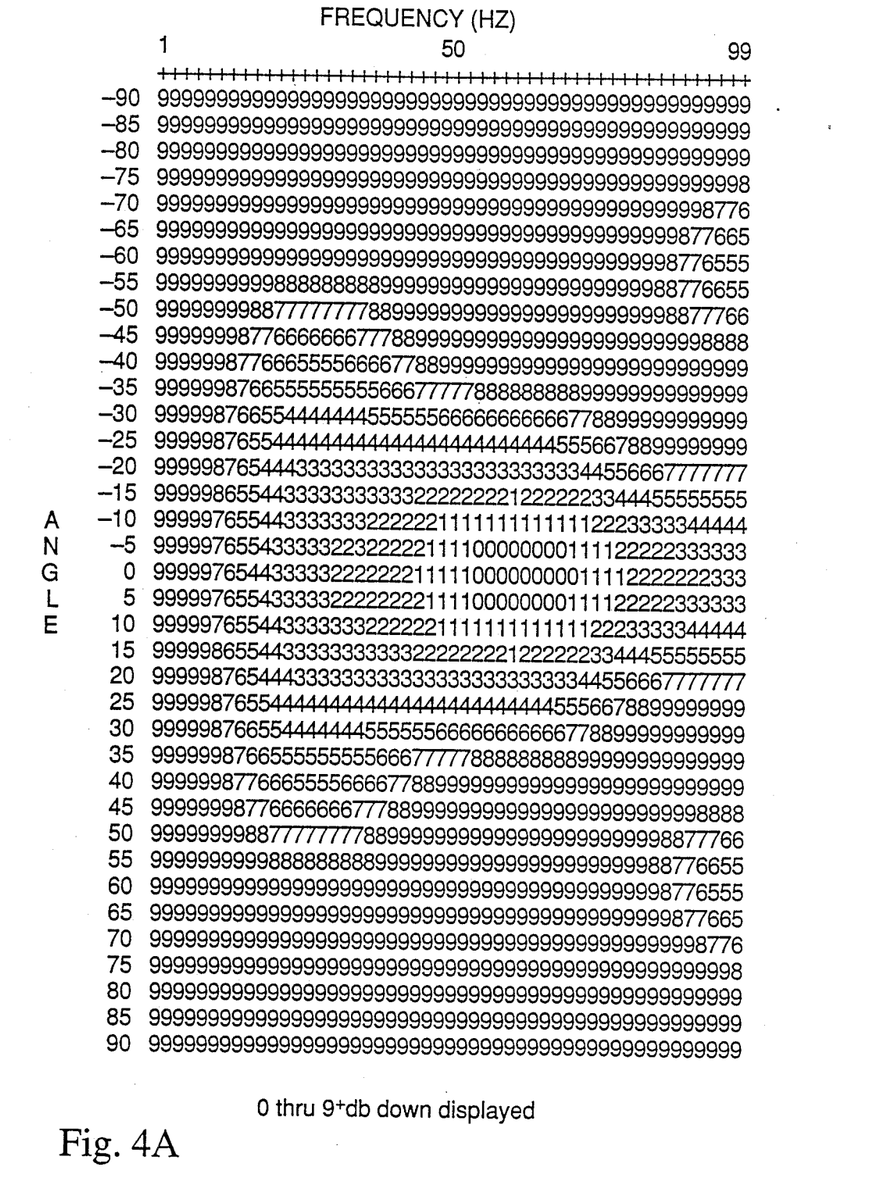
FIG. 4A is a graphical representation of the amplitude response of a source array of one embodiment of the present invention.
Figure 4B:
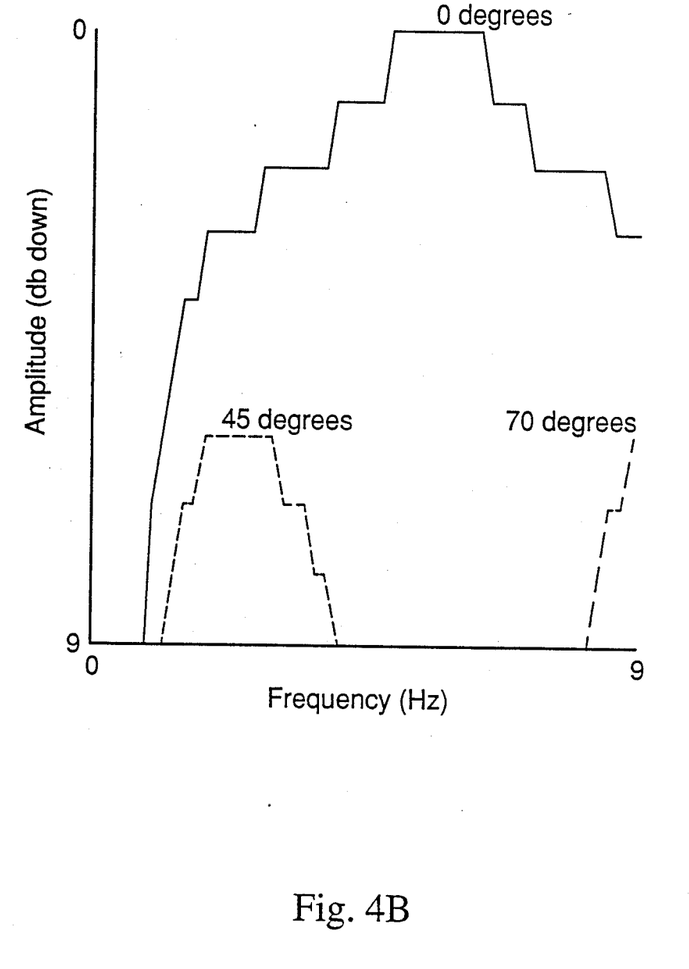
FIG. 4B is a graphical representation of the amplitude spectra for 0°, 45° and 70° radials from the amplitude response of the source array of FIG. 4A.

To illustrate the improved energy focusing performance of a source array of the type shown in FIG. 3, an array was designed to be suspended about 20 ft below the surface of the water and in the configuration shown in FIG. 3 with spacings between the source elements in the first set being 50 ft and the spacings between the source elements n the second set being 20 ft. The source elements were fired using a timing sequence as follows $S1-5:t=0$, $S6:1=4$ mss and $S7:t=8$ ms through a medium having a velocity of 5000 ft/sec. FIG. 4A shows an amplitude response for the source array described above, with ghosting included in the calculations. By comparing the amplitude response of FIG. 4A to FIG. 1A, one can note that the amplitude reduction has a definite variance with radial angle. FIG. 4B shows the amplitude spectra of the amplitude response of FIG. 4A with the difference in the responses on the 0° and 45° radials greatly enhanced over that which is shown in FIG. 1A. Therefore, it can be seen that the energy from the source array of the present invention can be focused along a chosen radial.

Once a subterranean feature to be imaged is located, the source array configuration and orientation is determined, as will be further described below. Thereafter, the source array is placed within the water or on land in the desired relationship to the wellbore(s) with the VSP receiver locations. The source elements of the first and second sets are sequentially activated using commercially available source array timing devices to focus the seismic energy along a selected radial path through the earth's subsurface, such as on a 45° radial for ray path A in FIG. 2. The resulting reflections are received at the receiver array 16 and sent to the surface for recording and processing, as is well-known to those skilled in the art. Utilizing various VSP processing techniques the reflections occurring from the primary subsurface feature can be enhanced and the reflections from the secondary subsurface feature, such as the boundary 12 in FIG. 2, can be suppressed. Thus, the operator can obtain better information regarding the primary subsurface feature.

The source array's 18 configuration is determined using published array response mechanisms that take into account the physical and other practical constraints that determine the number of possible source configurations. The specific array constraints are the number of sources, the location of the sources, the types of sources, and the source detonation time relationship. Taking these in order, the number of sources is limited by the control board or the number of lines that will be used to fire the guns. Theoretically, more sources will allow better focusing of energy; however, in the practical sense, one is limited to about 8-10 source elements. The locations of the source elements is crucial to the energy focusing success of the source array in that the limitations in the vertical case are encountered in the marine case due to the instability of the gun response below about 60-70 ft depth and in the land case due to having to dig a deep enough pit or find a suitable wellbore. Constraints in the horizontal case are due to the geometry of the rig or vessel from which the array will be deployed, as well as from high frequency side lobes affecting the recording bandwidth. Concerning source type limitations, one is constrained to a limited number of guns. Optionally, a source array emphasizing a broad amplitude spectrum can be deployed at each source location. Finally, the typical timing constraints are not a problem in the use of the present invention. One last concern is that the gun rise time varies with depth, so that at various depths, the same gun will reach maximum amplitude at different times. This manifests itself as another temporal correction that must be modeled and included in all calculations.

Once one knows the purpose for shooting the VSP, i.e., the general radial direction and the type of primary subterranean feature to be imaged, various array configurations are modeled. One then varies the detonation times in the model to direct energy along a desired radial path between the vertical and the horizontal. For example, if one detonates each source element when the wave field is only one half way between it and the previous source element, one produces a wave field maximum half way between the vertical and the horizontal, or approximately 45°. Similarly, by varying the detonation times corresponding to other fractions of the distance between adjacent source elements, one cause the energy to be focused
anywhere between 0°-90°. For the spatial aspects of the source array, one must carefullY consider varying the detonation time on this part of the array since to detonate all of these sources on the spatial array section at once may overwhelm any directionality imposed by the vertical part of the array. For example, consider the case where a cross pattern of the source array shown in FIG. 3. If one is trying to image the salt dome 14 of FIG. 2, one may want to detonate the source point at the part of the cross furthest away from the salt dome to be followed by closer sources (possibly including the vertical part of the array), and finally followed by the closest source point to the salt dome. This will help in directing the source energy ray along ray path A toward the salt dome 14.

Figure 5:
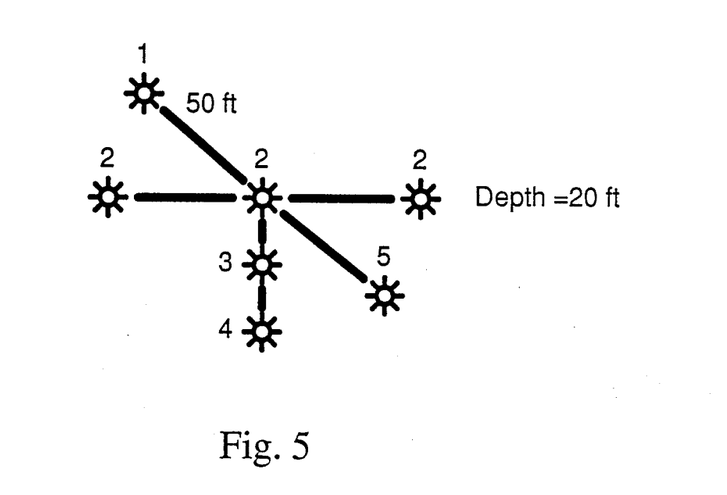
FIG. 5 is a graphical representation of the amplitude spectra for 0°, 45° and 70° radials from a source array designed to focus energy along a 45° radial.

For the source array shown in FIG. 3, if one is to focus its energy on the 45° radial, then then the source element S1 is fired first with source elements S4, S2, and S5 firing each at the same time and delayed 10 milliseconds; source element S3 is fired with a delay of 12 milliseconds; source element S7 is fired with a delay time of 14 milliseconds; and source element S3 is fired last with a delay time of 20 milliseconds. The amplitude spectra for such delayed timings to image a 45° angle is shown in FIG. 5, wherein it can be readily seen that for the 0°, 45°, and 70° radial responses that the 45° radial has the greatest response and amplitude, which is exactly what is desired to focus the energy towards the salt dome 14 and enhanced the received signals therefrom and reduce the signals from the secondary features.

By use of this above technique and source array, energy can be steered in any radial direction as is desired from 0°-90°, i.e., from the vertical to the horizontal, and then the energy having the greatest response can then be processed in any well known conventional manner to image the desired subterranean feature and to suppress other targets which can interfere therewith.

Wherein the present invention has been described in particular relation to the drawings attached hereto, it should be understood that other and further modifications, apart from those shown and suggested herein, may be made within the scope and spirit of the present invention.

What is claimed:

1. A source array useful in vertical seismic profiling, comprising:
    a first set of source elements having horizontal extent spaced in at least a first direction and a second, nonparallel direction; and
    and a second set of source elements having vertical extent and spaced linearly below the first set of source elements,
    wherein the spacing of the source elements in one of the sets is selected to be greater than or approximately ¼ the dominant wave length of energy emitted by the source elements in the source array.

2. A source array of claim 1 wherein the first and second sets of source elements have at least one common source element.

3. A source array of claim 1 wherein the first direction spacing of the first set of source element is greater than the vertical extent spacing of the second set of source elements.

4. A source array of claim 1 and including means for sequentially activating the source element to the first and second set of source elements.

5. A source array of claim 1 wherein the spacing between each of the source elements of the first set are approximately equal.

6. A source array of claim 1 wherein the spacing between each of the source elements of the second set are approximately equal.

7. A method of vertical seismic profiling using an array of source elements arranged to have a first set of source elements having horizontal extent and spaced in at least a first direction and a second, nonparallel direction, and a second set of source elements spaced linearly below the first set of source elements and having vertical extent, the method comprising:
    (a) selecting the spacing of the source elements of one of the sets to be greater than or approximately ¼ of the dominant wave length of energy emitted by the source elements in the source array
    (b) sequentially activating source elements in the first set and the second set to focus seismic energy along selected radial paths through the earth's subsurface; and
    (c) recording at a receiver array the earth's subsurface response to the seismic energy imparted from the sequentially activated source elements.

8. The method of claim 7 wherein the sequential activation of the source elements is determined by the direction and inclination from the source array of the subsurface feature to be imaged; and determining the activation sequence of the source elements to focus the maximum resulting energy towards the subsurface feature to be imaged.

* * * * *